H. F. BURHAM.
CREAM CAN RINSER AND STERILIZER.
APPLICATION FILED JULY 25, 1913.
1,146,845.
Patented July 20, 1915.
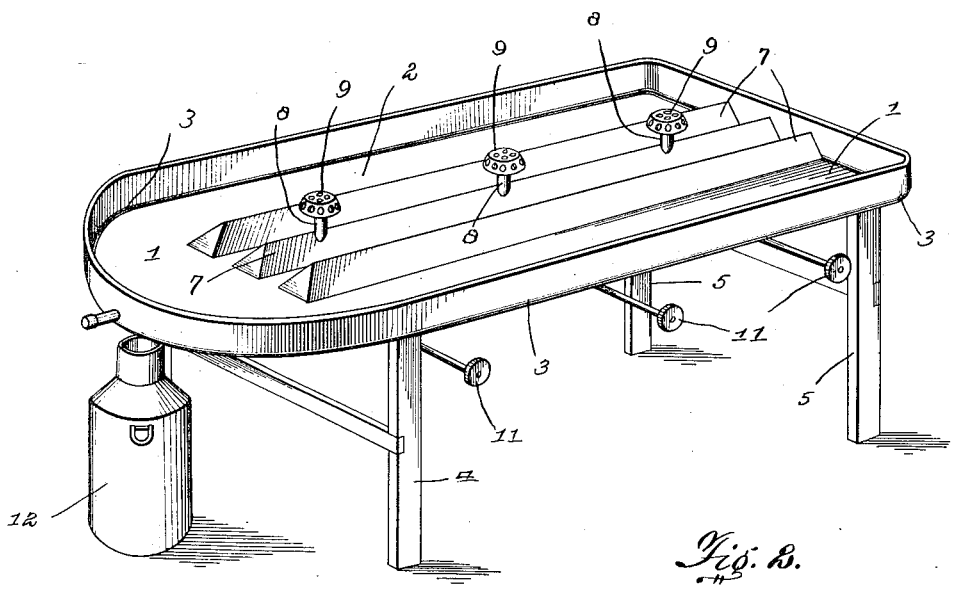
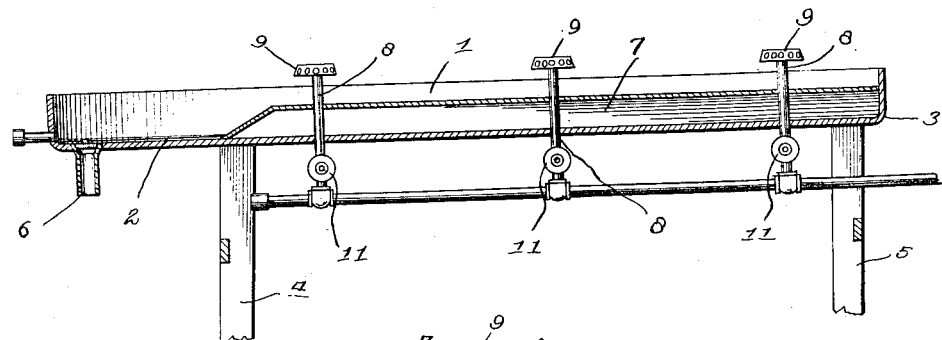
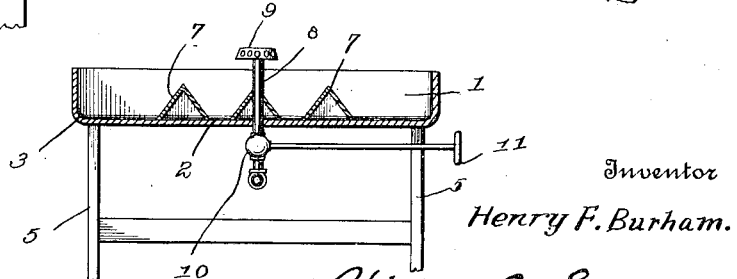
Witnesses
Frederick L. Fore.
C. A. Hines.
Inventor
Henry F. Burham.
By Victor J. Evans.
Attorney

UNITED STATES PATENT OFFICE.

HENRY F. BURHAM, OF WAUNETA, NEBRASKA.

CREAM-CAN RINSER AND STERILIZER.

1,146,845.

Specification of Letters Patent.

Patented July 20, 1915.

Application filed July 25, 1913. Serial No. 781,243.

*To all whom it may concern:*

Be it known that I, HENRY F. BURHAM, a citizen of the United States, residing at Wauneta, in the county of Chase and State of Nebraska, have invented new and useful Improvements in Cream-Can Rinsers and Sterilizers, of which the following is a specification.

This invention relates to a cream can rinser and sterilizer, the object of the invention being to provide a device by means of which cans containing a percentage of cream ordinarily allowed to go to waste may be drained of the cream and the latter recovered, and the can simultaneously cleansed and sterilized.

A further object of the invention is to provide a simple, cheap and efficient device for the purpose stated, by which one or more cans may be simultaneously rinsed and sterilized, and the cream recovered therefrom drawn off into a suitable receptacle.

The invention consists of the features of construction, combination and arrangement of parts hereinafter fully described and claimed, reference being had to the accompanying drawings in which:—

Figure 1 is a perspective view of a cream can rinser and sterilizer embodying my invention. Fig. 2 is a vertical longitudinal section of the same. Fig. 3 is a vertical transverse section.

In carrying my invention into practice I provide an oblong rectangular pan or trough 1, preferably having a flat bottom 2 rounded, as at 3, at its point of junction with the side wall of the pan, to facilitate the drainage off of the liquid contents, as well as to enable said pan to be conveniently cleansed and maintained in a sanitary condition. The pan is mounted at its opposite ends upon supporting legs or uprights 4 and 5, and is provided at one end with a discharge outlet 6. The supporting legs at the said outlet end of the pan are preferably of less height than the supporting legs at the opposite end thereof, so that the bottom of the pan will incline toward the outlet 6 to facilitate the flow of the recovered cream into the final receptacle by gravity.

Extending longitudinally of the pan are one or more, preferably three deflectors 7, each of approximately inverted V-shape, which deflectors are suitably secured to the pan bottom 2 and have their sides arranged to form conducting gutters or channels and sloping surfaces for the ready flow of the collected waste cream to the outlet 6. Extending upwardly through the bottom 2, and also through the ridge or crown portion of one of said deflectors is a steam or hot water supply pipe 8 terminating at its upper end in a perforated head or nozzle. Any number of these water or steam supply pipes may be employed and arranged at intervals along the deflectors, and each of said pipes is designed to be supplied with hot water or steam from a suitable source and is provided with a cut off valve 10 having a suitable handle 11 extending outwardly beyond the bottom of the pan so that the flow of steam or hot water through the pipes may be readily and conveniently controlled or cut off, at the will of the operator. The pan and other parts of the appliance may be made of galvanized iron, enamel metal, or of any other suitable material of sanitary character which will permit the device to be easily and conveniently cleansed.

In the practical use of the device, a can or other suitable receptacle 12 to receive the recovered cream is placed beneath and in communication with the outlet spout 6, and the cans which are to be rinsed and sterilized and from which the cream is to be recovered are placed in inverted position over the deflectors and in such relation to the nozzles 9 that the steam or hot water from said nozzles will enter the cans and rinse out all of the contained cream, and at the same time thoroughly cleanse and sterilize the cans. The steam is preferably employed as the rinsing and sterilizing agent, on account of its greater convenience and the reduced amount of moisture resulting from the water of condensation which is admixed with the cream. The cream so displaced from the inverted cans flows down the sides of the deflector into the channels or body of the pan and thence by gravity into the collecting receptacle 12 in which it may be separated by gravity or any other suitable process from the accompanying moisture. In this manner a large number of cans containing a greater or less percentage of cream may be cleansed and sterilized within a minimum period of time and the cream recovered for use, obviating the loss from waste commonly experienced, and it will be seen that a simple, inexpensive and efficient type of device is provided for the purposes stated and which enables the work being carried on in a ready and convenient manner.

I claim:—

An apparatus for rinsing and sterilizing cream cans comprising a shallow trough-like inclined receptacle, said receptacle being provided at its lower end with an outlet, a series of spaced longitudinally disposed deflectors extending along the bottom of the pan from the upper end thereof to a point short of the lower end, said deflectors being of triangular formation in cross section and having the apices thereof presented upwardly, conducting pipes extending through the bottom of the pan and apex of the central deflector, nozzles carried by the upper ends of the pipes, a steam supply pipe connected with the conducting pipes, and said deflectors being positioned to support a can inverted whereby said nozzle will project centrally within the mouth thereof to uniformly distribute the cleaning agent over the area of the interior of the can.

In testimony whereof I affix my signature in presence of two witnesses.

HENRY F. BURHAM.

Witnesses:
H. H. GROSBACH,
GEORGE MCGOODIN.